United States Patent [19]

Michel et al.

[11] Patent Number: 5,732,171

[45] Date of Patent: Mar. 24, 1998

[54] DEVICE FOR SPATIALLY SEPARATING AND/OR JOINING OPTICAL WAVE CHANNELS

[75] Inventors: Herbert Michel; Reinhardt März, both of München; Achim Reichelt, Unterhaching; Gerhard Heise, München, all of Germany

[73] Assignee: Siemens Aktiengesellschaft, Munich, Germany

[21] Appl. No.: 765,074

[22] PCT Filed: Jun. 7, 1995

[86] PCT No.: PCT/DE95/00745

§ 371 Date: Dec. 27, 1996

§ 102(e) Date: Dec. 27, 1996

[87] PCT Pub. No.: WO96/00915

PCT Pub. Date: Jan. 11, 1996

[30] Foreign Application Priority Data

Jun. 28, 1994 [DE] Germany .................. 44 22 651.9

[51] Int. Cl.[6] .................................................. G02B 6/26
[52] U.S. Cl. .................. 385/27; 385/31; 385/39; 385/46
[58] Field of Search .................. 385/27, 31, 37, 385/39, 46, 50

[56] References Cited

U.S. PATENT DOCUMENTS

| | | | |
|---|---|---|---|
| 5,136,671 | 8/1992 | Dragone | 385/46 |
| 5,226,100 | 7/1993 | Maerz | 385/45 |
| 5,243,672 | 9/1993 | Dragone | 385/46 |
| 5,559,906 | 9/1996 | Maerz . | |

FOREIGN PATENT DOCUMENTS 0 476 384  3/1992  European Pat. Off. .
0 662 621  7/1995  European Pat. Off. .

OTHER PUBLICATIONS

A.R. Vellekoop et al, "Four–Channel Integrated–Optic Wavelength Demultiplexer with Weak Polarization Dependence", *Journal of Lightwave Technology*, vol. 9, No. 3, Mar. 1991, pp. 310–314.

H. Takahashi et al, "10GHz Spacing Optical Frequency Division Multiplexer Based on Arrayed–Waveguide Grating", *Electronics Letters*, vol. 28, No. 4, Feb. 13, 1992, pp. 380–382.

C. Dragone et al, "Integrated Optics NxN Multiplexer on Silicon", *IEEE Photonics Technology Letters*, vol. 3, No. 10, Oct. 1991, pp. 896–899.

R. Adar et al, "Broad–Band Array Multiplexers Made with Silica Waveguides on Silicon", *Journal of Lightwave Technology*, vol. 11, No. 2, Feb. 1993, pp. 212–219.

Vellekoop et al, "A Small–Size Polarization Splitter Based on a Planar Optical Phased Array", *Journal of Lightwave Technology*, vol. 8, No. 1, Jan. 1990, pp. 118–124.

*Primary Examiner*—Phan T. H. Palmer
*Attorney, Agent, or Firm*—Hill, Steadman & Simpson

[57] ABSTRACT

In a phased-array filter, mutually spatially separated planar waveguides arranged on the surface of a substrate between two substrate edges are optically connected to one another by an optical phase shift in the form of a plurality of strip-type optical waveguides which extend in a bent fashion and are of different optical length. In order to be able to continuously adjust the central wavelength of the filter by varying the location of launching within certain limits, a planar waveguide is arranged directly at the other substrate edge so as to permit direct launching into this planar waveguide.

3 Claims, 2 Drawing Sheets

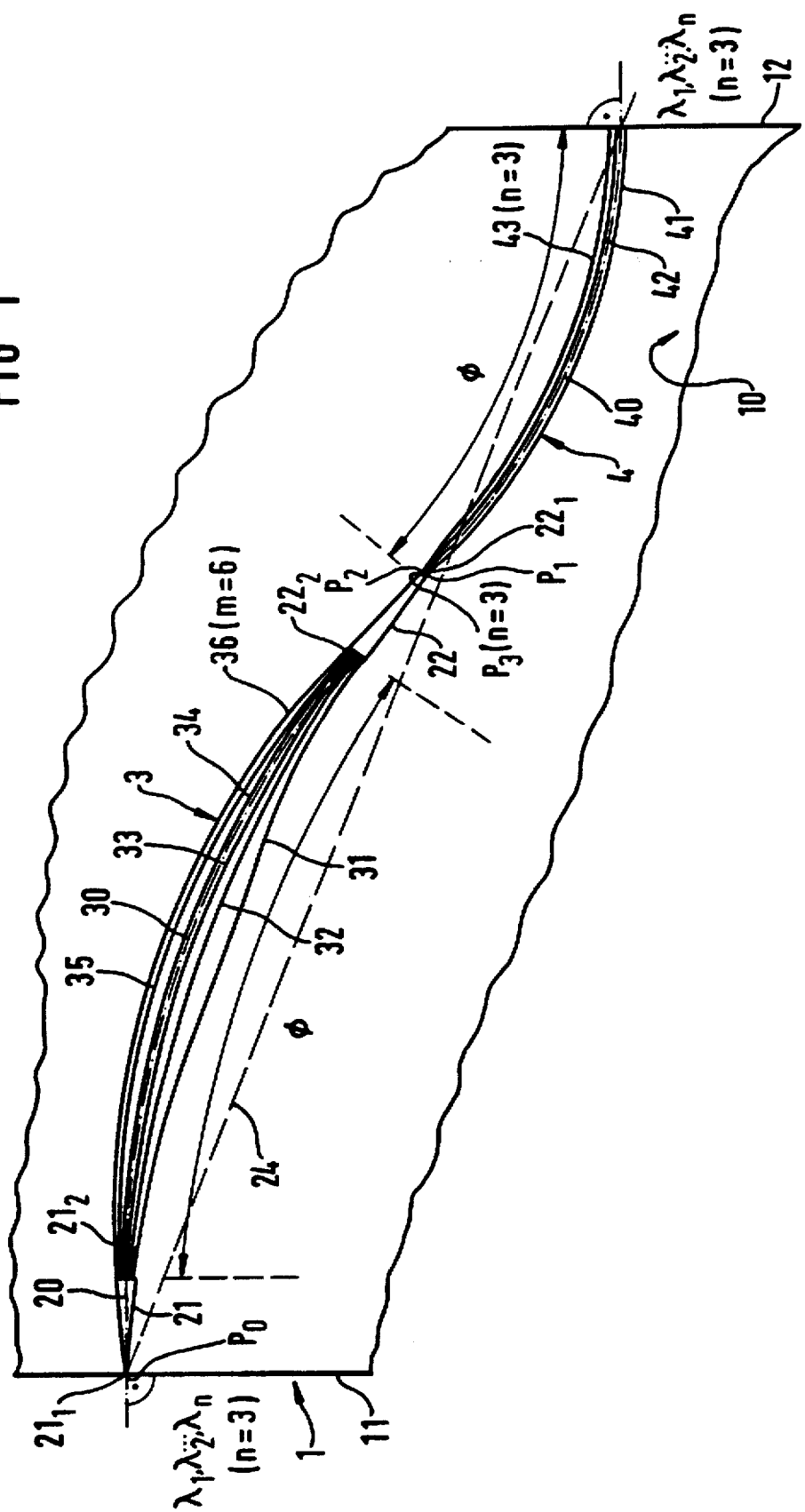

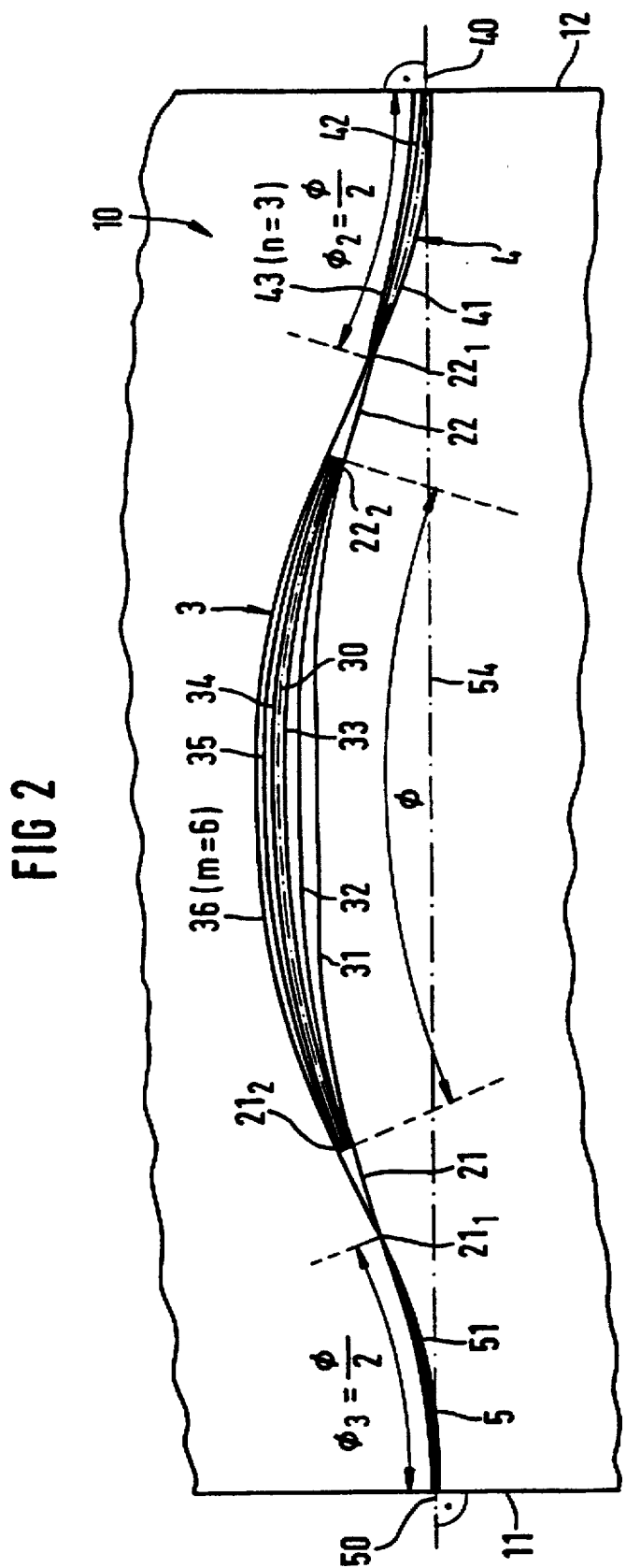

DEVICE FOR SPATIALLY SEPARATING AND/OR JOINING OPTICAL WAVE CHANNELS

BACKGROUND OF THE INVENTION

The invention relates to a device for spatially separating and/or joining optical wavelength channels which has a substrate with a substrate edge and substrate surface, a pair of planar waveguides disposed on a surface of the substrate waveguide with each planar waveguide having a first end face and a second end face, and an optical phase arrangement comprising a plurality of strip-type optical waveguides of different optical lengths, which extend in a curved fashion, being disposed on the substrate surface and extending between the first end faces of the two planar waveguides. The two planar waveguides are arranged so that the second end faces face away from the phase-shift arrangement with the second end face of one of the planar waveguides facing a substrate edge. The optical connections between the first end faces of the planar waveguides and the waveguides of the phase shifter are arranged so that wavelength channels can be coupled in at a common point on the second end face of the one planar waveguide and are distributed in the one planar waveguide into all of the waveguides of the phase-shift arrangement and the wavelength channels distributed on the waveguides of the phase-shift channel are then fed by these waveguides to the first end face of the other planar waveguide and are distributed by optical interference in this other planar waveguide onto points spatially separated from one another on the second end face of the other planar waveguide for the purpose of individually being outputted from the other planar waveguide, or the direction can be reversed so that the waveguide channels can be launched into the spatially separated points of the second end face of the other planar waveguide and can be distributed in this other waveguide into all of the waveguides of the phase-shift arrangement, and the wavelength channels are fed into the one planar waveguide and are fed in this one planar waveguide by optical interference to a common point on the second end face facing the substrate edge for the purpose of a common outputting from this one planar waveguide.

Such devices are increasingly of interest in optical information transmission as spectral filters for wavelength-division multiplex operation (see, for example, A. R. Vellekoop, M. K. Smit: Four-channel integrated-optic wavelength demultiplexer with weak polarization dependence, IEEE J. Lightwave Tech. 9 (1991), pages 310–314; H. Takahashi, L Nishi, Y. Hibino: 10 GHz spacing optical frequency division multiplexer based on arrayed-waveguide grating, Electron. Lett. 28 (1992), pages 380–382; C. Dragone, C. A. Edwards, R. C. Kistler: Integrated optics N×N multiplexer on silicon, IEEE Photonics Technology Letters, Vol. 3, No. 10 (1991) (1992), pages 896–899; R. Adar, C. H. Henry, C. Dragone, R. C. Kistler, M. A. Milbrodt: Broadband array multiplexers made with silica waveguides on silicon, IEEE J. Lightwave Tech. 11 (1993), pages 212–219). They are also referred to as phased-array-filters.

Like conventional grating spectrographs, such devices permit parallel filtering of many optical wavelength channels.

The optical phase-shift arrangement provided in such an arrangement, and composed of the plurality of strip-type optical waveguides of different length extending in a curved fashion forms a phase-shift region.

A device of the type mentioned at the beginning which has already been proposed has a launching arrangement composed of at least one strip-type optical waveguide which extends in a curved fashion opposite to the waveguides of the phase-shift arrangement and which optically connects the second end face, facing the substrate edge, of one planar waveguide to this substrate edge. The second end face, which is, averted from the phase-shift arrangement, of the other planar waveguide is optically connected, by strip-type optical waveguides of an output arrangement which extend in a curved fashion opposite to the waveguides of the phase-shift arrangement, to another substrate edge assigned to this other planar waveguide.

For the purpose of spatially separating the optical wavelength channels, $\lambda_1$ to $\lambda_n$, where n can be an arbitrary whole number, these wavelength channels are launched into the waveguide of the launching arrangement on one substrate edge at a common point, and fed to the one planar waveguide. The light propagates freely in this one planar waveguide and is distributed uniformly into the waveguides of the phase-shift arrangement, that is to say each individual wavelength channel is uniformly distributed into this waveguide.

The light distributed into the waveguides of the phase-shift arrangement is fed in these waveguides to the other planar waveguide with a phase shift which varies from waveguide to waveguide. In the other planar waveguide, the filtered light is focused, depending in each case on its wavelength, into in each case one of a plurality of spatially separated points on the second end face, which is, averted from the phase-shift arrangement, of the other planar waveguide. One each of the waveguides of the output arrangement is coupled to each of these points.

The waveguide or waveguides of the launching arrangement and the waveguides of the output arrangement have two functions to fulfil:

a) In a fashion similar to the gap of a conventional optical monochromator, they determine the wavelength and bandwidth of the individual wavelength channels of the filter by their position and width.

b) Together, they equalize the curved profile of the waveguides of the phase-shift arrangement by their curvature, with the result that the launching and output into and from the filter is rendered possible at substrate edges which are essentially parallel to one another.

In addition, the waveguides of the output arrangement are intended to increase the spacing of the wavelength channels, which is caused by the dispersion of the filter, to such an extent that it is possible to couple fiber arrays or photodiode arrays directly to the device.

One disadvantage of the phase-array filter with respect to other specific spectrographs, for example flat-field spectrographs, consists in that the central wavelength and the spacing of the individual wavelength channels of the filter are completely determined by the geometry of the layout and by the effective refractive index of the waveguides. Subsequent adjustment is not possible. As a result, on the one hand the manufacturing tolerances for a filter with defined channels are very narrow, while on the other hand, a new layout is required as soon as a different absolute position of the channels is required in conjunction with no other change to the channel array.

SUMMARY OF THE INVENTION

In order to add at least a certain flexibility in the selection of the central wavelength, in the proposed device the launching arrangement mostly comprises a plurality of waveguides. Each of them then has its own output wavelength channels which are spectrally shifted with respect to the others.

It is the object of the invention to improve a device of the type mentioned at the beginning so that the central wavelength of the finished device can be adjusted continuously within certain limits by varying the location of launching.

This object is achieved by an improvement which has the one planar waveguide being arranged at the substrate edge with an optical axis of the one planar waveguide, which connects the first and second end face of the one planar waveguide extending essentially perpendicular to the substrate edge.

The light can be launched directly into one planar waveguide by means of the measure according to the invention. A translation of the point, which is defined by a launching fiber, for example, and serves the purpose of launching, on the relevant end face of one planar waveguide in the plane thereof in a fashion parallel to one substrate edge leads to a spectral shift in the transmission wavelength of each waveguide of the output arrangement. The desired central wavelength of the device according to the invention can be adjusted in this way when adjusting the launching fiber.

The device according to the invention can also be used to join separate optical wavelength channels. In this case, the separate wavelength channels are to be launched individually at spatially separate points on the second end face, which is, averted from the phase-shift arrangement, of the other planar waveguide, and can be output at a common point of the second end face, which is, facing one substrate edge, of the one planar waveguide.

The invention is explained in more detail by way of example in the following description with the aid of the figures.

BRIEF DESCRIPTION OF THE DRAWINGS

FIG. 1 is a diagrammatic plan view of a device according to the invention, and

FIG. 2 is a diagrammatic plan view of a device already proposed.

DESCRIPTION OF THE PREFERRED EMBODIMENTS

In the devices represented in FIGS. 1 and 2 and serving to spatially separate and/or join n (n=2, 3, . . . ) optical wavelength channels $\lambda_1$ to $\lambda_n$, there are arranged on the surface 10 of a substrate 1 between a substrate edge 11 and another substrate edge 12 essentially parallel thereto,

- a first or one planar waveguide 21, assigned to one substrate edge 11, and another or second planar waveguide 22, which is spatially separated from this first planar waveguide 21 and assigned to the other substrate edge 12,
- an optical phase-shift arrangement 3 composed of m (m=2, 3, . . . ) strip-type optical waveguides 31 to 3m of different optical length which extend in a curved fashion, and
- an output and/or launching arrangement 4 composed of n strip-shaped optical waveguides 41 to 4n which extend in a curved fashion opposite to the waveguides 31 to 3m of the phase-shift arrangement 3, it being the case that n<m is generally selected.

For the sake of simplicity, m=6 and n=3 in the examples represented in the drawings. In practice, m=50 and higher and n=8 to 10 are typical values. The larger n, the more wavelength channels can be separated by the phase-shift device, which acts as an optical grating.

The first and second planar waveguides 21 and 22 each have first end faces $21_2$ and $22_2$ and second end faces $21_1$ and $22_1$, respectively. The second end faces $21_1$ and $22_1$ face the respectively assigned substrate edges 11 and 12 and the first end faces $21_2$ and $22_2$, which are averted from the second end faces $21_1$ and $22_1$, are for the purpose of respectively launching and/or outputting the optical wavelength channels $\lambda_1$ to $\lambda_n$.

The waveguides 31 to 3m of the phase-shift arrangement 3 optically connect the end faces $21_2$ and $22_2$ of the first and second planar waveguides 21 and 22 to one another and define a curved fashion and has a specific curvature as well as a specific angle of curvature Φ.

The method of functioning of the phase-shift arrangement is described in the German patent application P 44 00 554. A special feature of this already described phase-shift arrangement is that at least one waveguide has a controllable phase-shift arrangement for the controlled production of a phase shift in an optical wave guided in this waveguide. This special feature, which constitutes an improvement, is not required in general nor even in the device according to the invention which is described here, but it can be provided.

The waveguides 41 to 4n and the output and/or launching arrangement 4 optically connect the first end face $22_1$, which is averted from the phase-shift arrangement, of the other or second planar waveguide 22 to the other substrate edge 12, which is assigned to this end face $22_1$ in such a way that the waveguides 41 to 4n of the output and/or launching arrangement 4 terminate essentially perpendicular at the other substrate edge 12 and define a common second axis 40, extending in a curved fashion, having a curvature which is opposite to the curvature of the axis 30 of the phase-shift device 3 but is essentially of the same magnitude, and the same angle of curvature Φ. "Perpendicular at the substrate edge" signifies that the optical axis 40 of the output and/or launching arrangement 4 intersects the other substrate edge 12 perpendicularly.

In the device according to the invention which is represented in FIG. 1, the special feature essential to the invention is that the first or one planar waveguide 21, which is assigned to one substrate edge 11, is arranged directly at this substrate edge 11 in such a way that an optical axis 20 of this first planar waveguide 21, which connects the two end faces $21_1$ and $21_2$ of this planar waveguide, is essentially perpendicular to the first substrate edge 11.

Furthermore, in the device according to the invention, there is the special feature, which is not required in principle, that the curved waveguides 31, 32, . . . 3m of the phase-shift device 3 and the curved waveguides 41, 42, . . . 4n of the output and/or launching arrangement 4 define a curvature which is opposite but essentially the same in absolute value, and also define essentially the same angle of curvature Φ.

The optical axes of the planar waveguides and of the phase-shift arrangement and output and/or launching arrangement preferably merge smoothly into one another.

In the operation of the device according to the invention in accordance with FIG. 1, a fiber (not represented) for launching and/or outputting the wavelength channels $\lambda_1$ to $\lambda_n$ into or from the first planar waveguide 21 with respect to the end face $21_1$, facing one substrate edge 11, of this first planar waveguide 21 is arranged coaxially with the optical axis 20 of this planar waveguide 21 in such a way that it can be displaced along one substrate edge 11 in a fashion axially parallel to the optical axis 20 and can thereby be adjusted to the desired central wavelength of the device.

It is achieved by the fact that the waveguides of the phase-shift arrangement 3 and, respectively, the output and/ or launching arrangement 4 have the same curvature in terms of absolute value and the same angle of curvature Φ that the output and/or launching arrangement 4 essentially compensates the curvature of the phase-shift arrangement 3 and that the waveguides 41 to 4n of the output and/or launching arrangement 4 terminate perpendicularly at one substrate edge 12, which is essentially parallel to the other substrate edge 11.

It may be pointed out that the device according to the invention does not in principle require an output and/or launching arrangement 4, although it is advantageous in many instances, particularly in the design described above. For example, it would be possible, opposite the points of the relevant end faces of the planar waveguides via which launching or outputting is performed, to fit displaceable optical transmitters or receivers for transmitting or receiving the wavelength channels, doing so directly opposite the end faces. The other planar waveguide could also then be arranged directly at the other substrate edge.

The device already proposed in accordance with FIG. 2, in which the parts which correspond to the device according to the invention in accordance with FIG. 1 are provided with the same reference symbols and are given the same designations, differs from the device according to the invention in that neither of the two planar waveguides 21 or 22 is arranged directly at a substrate edge 11 or 12; rather, a launching arrangement 5 composed of at least one strip-type optical waveguide 51 which extends in a curved fashion opposite to the waveguides 31 to 3m of the phase-shift arrangement 3 is provided which optically connects the end face $21_1$, facing one substrate edge 11, of one planar waveguide 21 to one substrate edge 11 in such a way that the waveguide 51 terminates essentially perpendicularly at one substrate edge 11, and defines a further optical axis 50 extending in a curved fashion opposite to the curvature of the axis 30 of the phase-shift arrangement but essentially having a curvature of the same magnitude and a further angle of curvature $\Phi_3$.

The angle of curvature $\Phi_2$ of the waveguides 41 to 4n of the output arrangement 4, and the angle of curvature $\Phi_3$ of the waveguide 51 of the launching arrangement 5 are equal in each case, in the device according to FIG. 2, to half the angle of curvature Φ of the waveguides 31 to 3m of the phase-shift arrangement 3 of this device.

The result of these measures in the case of the device according to FIG. 2 is that the waveguide 51 terminates perpendicularly at one substrate edge 11, and the waveguides 41 to 4n terminate perpendicularly at the other substrate edge 12.

In contrast to the proposed device according to FIG. 2, in which a straight line 54 which connects the end of the waveguide 51 located at one substrate edge 11 with an end of a waveguide 41, 42 . . . 4n located at the other substrate edge 12 and intersects the two substrate edges 11 and 12 essentially in a perpendicular fashion, in the case of the device according to the invention in accordance with FIG. 1 a corresponding straight line 24 extends in a clearly oblique fashion relative to the substrate edges 11 and 12.

We claim:

1. In a device for spatially separating optical wavelength channels, said device having a substrate with a substrate edge and substrate surface, two mutually spatially separated planar waveguides and an optical phase-shift arrangement, which is provided between the planar waveguides and is composed of a plurality of strip-type optical waveguides of different optical lengths extending in a curved fashion, are disposed on said surface, each planar waveguide has a first end which faces the phase-shift arrangement and a second end face, which is averted from the phase-shift arrangement and which second end faces serve for launching and/or outputting the optical wavelength channels, the second end face of one of the two planar waveguides faces the substrate edge and the first end faces of the planar waveguides are optically connected to one another by waveguides of the phase-shift arrangement so that the wavelength channels can be launched into the one planar waveguide at a common point and can, in each case, be distributed in the one planar waveguide into all of the waveguides of the phase-shift arrangement and the waveguide channels distributed into the waveguides of the phase-shift arrangement are fed in these waveguides to the other planar waveguide and are distributed by optical interference in the other planar waveguide into points spatially separated from one another on the second end face of the other planar waveguide for the purpose of individually being outputted from said other planar waveguide and/or the wavelength channels can be launched into the other planar waveguide at spatially separated points on the second end face and can be distributed in this other planar waveguide into all of the waveguides of the phase-shift arrangement and the wavelength channels distributed into the waveguides of the phase-shift arrangement can be fed in these waveguides to the one planar waveguide and are fed in the one planar waveguide by optical interference to a common point on the second end face of the one planar waveguide, which end face faces the substrate edge for the purpose of common outputting from this one planar waveguide, the improvements comprising the one planar waveguide being arranged directly at the substrate edge with an optical axis of the one planar waveguide which connects the two end faces of the planar waveguide being essentially perpendicular to the substrate edge.

2. In a device according to claim 1, wherein the second end face of the other waveguide faces another substrate edge and is arranged at a spacing from the other substrate edge and that an output end of launching arrangement is provided which is composed of a plurality of strip-type optical waveguides which connect the plurality of points for the individual outputting and/or launching of waveguide channels of the second end face of the other planar waveguide to the other substrate edge.

3. In a device according to claim 2, wherein the one substrate edge and the other substrate edge are essentially parallel to one another and wherein the waveguides of the output and/or launching arrangement are curved and have a common curved optical axis which is curved opposite to the curved optical axis common to the waveguides of the phase-shift arrangement but has essentially the same curvature and is curved at essentially the same angle of curvature and which terminate perpendicularly at the other substrate edge.

* * * * *